Aug. 31, 1926.
C. G. BUTLER
1,597,952
GREASE GUN CONNECTION
Filed Sept. 15, 1922
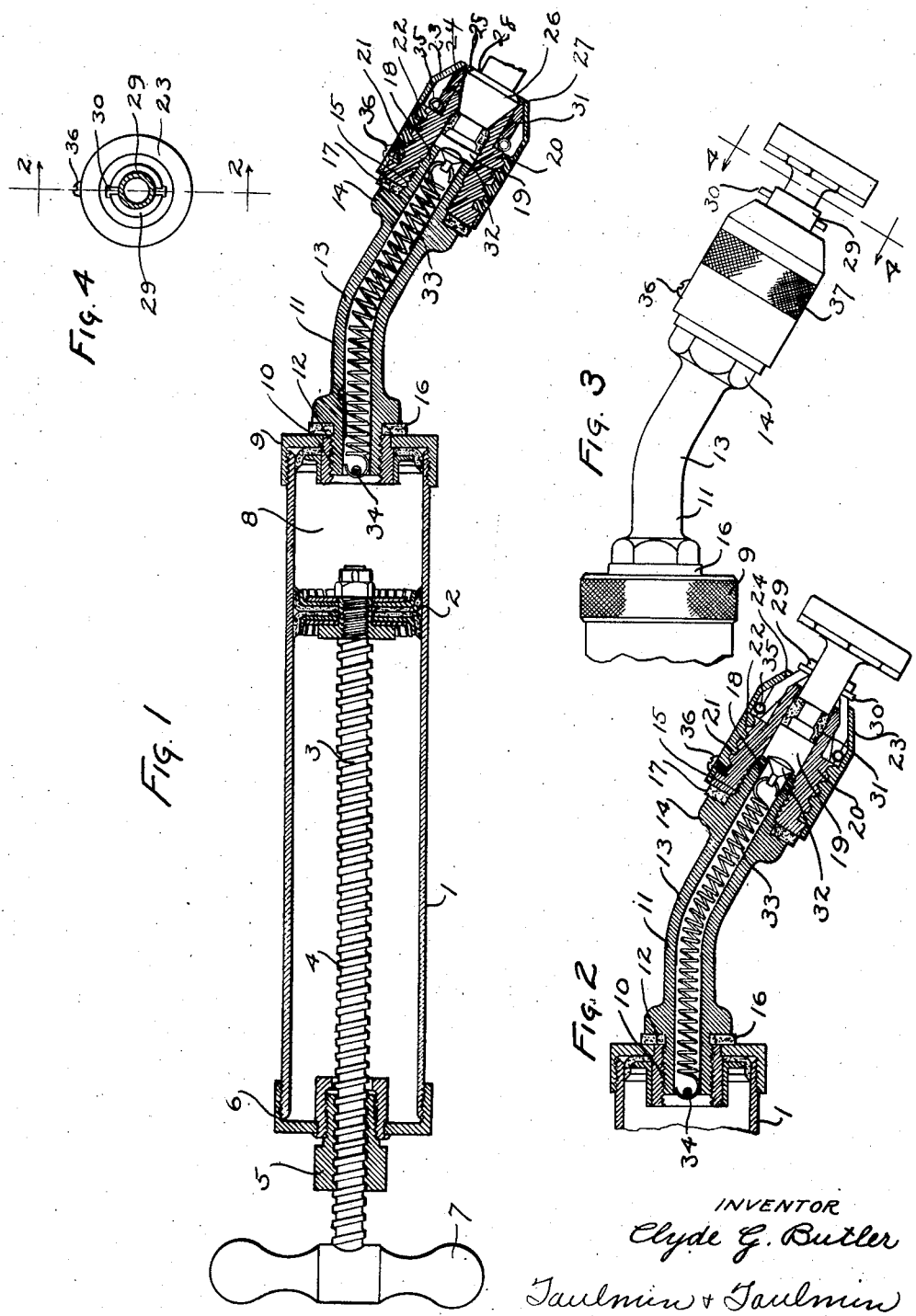
INVENTOR
Clyde G. Butler
Toulmin & Toulmin
ATTORNEYS Patented Aug. 31, 1926.

1,597,952

UNITED STATES PATENT OFFICE.

CLYDE G. BUTLER, OF DAYTON, OHIO.

GREASE-GUN CONNECTION.

Application filed September 15, 1922. Serial No. 588,413.

My invention relates to lubricating apparatus and in particular to grease guns for automotive equipment.

It is the object of my invention to provide a force feed system and apparatus for lubricating bearings and the like.

It is a further object of my invention to provide in combination with such an apparatus a delivery and attaching mechanism which shall be rigid, cannot be destroyed by bending, twisting and the like and cannot be injured by packing in a tool box.

It is a still further object to provide such a mechanism which may be readily detachable from the grease gun for cleaning and adjustment.

It is still a further object to provide with such an apparatus a locking means for engaging a delivery tube to a grease cup.

It is my object to provide a connection which will accommodate itself to varying types of grease cups and oil cups.

It is still a further object to provide a rigid delivery tube of such a construction and arranged at such an angle that it will accommodate itself to the very restricted locations of grease cups and the like.

It is still an additional object to provide a valve means in the delivery tube for controlling highly fluid lubricant when making its exit.

It is my object to provide a connection between the delivery tube and the oil cup which will permit of the positive locking of the parts to one another and to prevent the escape of highly fluid lubricant outside of the oil cup during the course of this delivery from the gun to the cup.

It is still a further object to provide a universal equipment which may be used both with highly fluid lubricant and lubricant that is either of the character of hard grease or the like.

Referring to the drawings:

Fig. 1 is a section of the complete equipment;

Fig. 2 is a section of the modified form of connecting chuck;

Fig. 3 is an elevation of the mechanism shown in Fig. 2;

Fig. 4 is a section on the line 4—4 of Fig. 3.

Referring to the drawings, the numeral 1 designates a lubricant containing cylinder in which is reciprocable a piston head carried by a piston rod 3, threaded exteriorly at 4, which threads are engaged with the corresponding threads of a nut 5 having exterior threads engaged with one head 6 of the barrel 1. The piston rod is adapted for rotation by the handle 7 to force lubricant from the area 8. The details of construction and of the cylinder and claims thereon are set forth in my copending application relative to this structure. The cylinder has an end or cap piece 9 in removable threaded engagement therewith, the said cap having a centrally disposed tubular section 10 interiorly threaded for engagement with the end of a delivery tube 11 which is exteriorly threaded at its extremity as at 12, and is further provided with a circumferential shoulder as an abutment for engaging a gasket 16, interposed between the member 9 and the shoulder to obtain a sealed connection.

The tube 11 is bent as at 13 at an angle, the angle herein preferably being substantially 30° to facilitate the connection of the member with the grease cups to which lubricant is to be delivered, in a manner to be described.

The tube at the opposite end is threaded as at 15 and is further provided with a circumferential abutment shoulder 14 between which abutment and the chuck is interposed a washer 17. Upon the threaded portion 18 is mounted a tubular head or chuck member 20 having an interior bore 19 in communication with the bore on the tube 11. The head 20 is exteriorly threaded as at 21 for engagement with the corresponding interior threads of a tubular locking member 22 which member has an outer conical portion 23.

The outermost portion of the head is counter-turned to provide a circumferential seat and a longitudinally extending cylindrical wall against which certain locking fingers are adapted to lie or abut when the fingers are in locking position. A plurality of locking fingers 24 are removably held at one end, and, in locked position, are adapted to lie against the counter-turned portion of the head, a yielding retaining means 35, herein having the form of a coil spring, encircling and engaging the fingers in a manner to cause the outer ends of the same to be thrown outwardly when released, their action being similar to that of a hinge. Each finger is provided with an inturned hook portion 27 adapted to overhang and extend partially across the delivery passage of the head when in locking position, and when engaged flatly against the counter-turned portion of the head.

The locking member 22 having the cone shaped outer extremity is adapted to circumscribe the fingers and to engage with the outer beveled ends of the fingers to force the same inwardly to locking position.

The grease cup is represented at 26 and in the first form of the invention is of conical configuration and is adapted to engage a corresponding conical bore of the head. The grease cup at its junction with its tubular delivery portion forms a shoulder and the periphery of this shoulder is beveled as at 28 for engagement by the inturned ends of the fingers. In the modification of Figure 2, each finger has a bayonet joint or a hook at its outer extremity, the fingers being shown herein as projecting outwardly and parallel to the grease cup to form a hook 29 which engages with diametrically related projections 30 carried by the grease cup, the grease cup in this instance having a cylindrical portion the end of which enters the delivery passage as in the first case and abuts the gasket 31 which is seated against a circumferential shoulder of the chuck bore. This washer 31 prevents egress of lubricant other than through the delivery passage of the nipple.

The washer is spaced away from the outer end of the delivery tube sufficiently to permit the opening of a valve 32 which is seated against the end of the tube within the chuck bore and the valve is held in seated position by a spring 33 extending through the tube 11 and fixed at its opposite end by a cross pin 34. The function of the valve is to prevent escape of the lubricant when the device is not in use. The sleeve 22 is limited in its movements by a set screw 36.

The head may be formed integral with the bent delivery tube. In such an instance, the valve 32 would be positioned substantially in the manner shown, the bore of the chuck being shouldered to form a seat. The grease cup may be of any desired form either with a conical head as shown in Figure 1, or a cylindrical head as shown in Figures 2, 3 and 4. The locking casing is provided with a knurled surface 37.

In operating the device the sleeve is first turned in one direction and fed outwardly during which operation the fingers are thrown outwardly by the spring removing the fingers from their overhanging position. When in this open position, the chuck or head is brought into engagement with the grease cup or nipple and the sleeve is then turned in an opposite direction to force the conical portion to engagement with the fingers to draw the same inwardly to clutch position, as shown in Figure 1.

Having thus fully described my invention what I claim as new and desire to secure by Letters Patent is:—

1. In a device of the class described, a bent fluid delivery tube having a head at one extremity intermediately threaded and counter-turned at the outer extremity to provide a seat, locking fingers disposed against said seat and counter-turned portion when in locking position, said fingers having inturned extremities adapted to overhang the passage and engage a grease cup for locking the delivery tube to the cup, an elastic member encircling the inner ends of said fingers and yieldably hinging the same, and means engaged with the threads of the head for forcing the fingers to and holding the same in locking position.

2. In a device of the class described, a fluid delivery tube having a head at one end exteriorly threaded, and counter-turned at one extremity to provide a seat, locking fingers disposed against said seat and counter-turned portion when in locking position, each finger having an inturned outer extremity adapted to partially extend across the tube passage when in locking position, to engage a shoulder of a grease cup to lock the delivery tube thereto, an elastic member encircling said fingers and yieldably hinging the same, and means engaged with the threads of the head rotatable for forcing the fingers to locking engagements.

3. In a lubricating system, a delivery tube slightly bent medially, and having its ends exteriorly threaded and shouldered to form abutments spaced inwardly from the ends of the tube, an outwardly opening valve for closing the delivery end of the tube during a non-delivery period, a head engaged with the delivery end of the tube having a delivery passage communicating therewith, said head counter-turned exteriorly to provide a seat, locking fingers yieldably held at one extremity longitudinally of the head against the counter-turned portion, having hooked ends adapted to extend partially across the delivery passage of the tube, a grease cup engaged within the delivery passage and shouldered for engagement by said hooked ends when in delivery position, and a sleeve engaged with the threads of said head adapted for rotation and translation to force said fingers to locking position and hold the same in such position.

4. In a device of the class described, a delivery nozzle providing a passage having a conical outwardly flared delivery end for sealingly co-acting wtih a nipple, said nozzle exteriorly counter-turned to provide a seat, fingers mounted circumferentially of said counter-turned portion and having in-turned portions adapted to project across the conical delivery passage of the nozzle, an elastic member encircling and yieldably hinging and securing said fingers, a receiving nipple adapted to be inserted and sealingly fitted within the delivery passage of the nozzle and having a shoulder engageable by said fingers for locking the nozzle to the nipple, and means for forcing said fingers to and holding the same in locking position.

5. A lubricating system comprising a tubular delivery element, and a receiving element having a sealing fit within the discharge end of the delivery element, said delivery element terminally counter-turned to form a seat and having a plurality of locking fingers arranged around the counter-turned portion and abutting the seat at one end, parallel with the axis of the element, said fingers yieldably hingedly held at their inner ends against the counter-turned portion and adapted to swing outwardly, and having their outer ends adapted for locking engagement with the receiving element, for preventing withdrawal of either element, and means translatable upon the delivery element for forcing the fingers to and holding the same in locking position.

In testimony whereof I affix my signature.

CLYDE G. BUTLER.